United States Patent [19]

Engle

[11] 4,074,700

[45] Feb. 21, 1978

[54] QUICK-ACTING VALVE ASSEMBLY

[75] Inventor: Thomas H. Engle, Cape Vincent, N.Y.

[73] Assignee: General Signal Corporation, Rochester, N.Y.

[21] Appl. No.: 616,097

[22] Filed: Sept. 23, 1975

Related U.S. Application Data

[63] Continuation of Ser. No. 484,188, June 28, 1974, abandoned.

[51] Int. Cl.² ............ F16K 25/00; F16K 31/06
[52] U.S. Cl. .................. 137/625.27; 137/625.65; 251/84; 251/357; 251/282; 251/129
[58] Field of Search .......... 137/625.5, 625.65, 625.27, 137/625.25, 625.26, 596.2; 251/357, 84, 282, 129

[56] References Cited

U.S. PATENT DOCUMENTS

| 404,504 | 6/1889 | Ross | 137/505.18 |
|---|---|---|---|
| 2,934,090 | 4/1960 | Kenann et al. | 251/129 |
| 2,980,139 | 4/1961 | Lynn | 251/282 X |
| 3,092,145 | 6/1963 | Brinkel | 251/129 |
| 3,101,742 | 8/1963 | Kellogg | 137/625.25 |
| 3,282,289 | 11/1966 | Vick | 251/282 |

FOREIGN PATENT DOCUMENTS 638,238  11/1936  Germany .................. 137/625.27

Primary Examiner—William R. Cline
Assistant Examiner—H. Jay Spiegel
Attorney, Agent, or Firm—Pollock, Vande Sande & Priddy

[57] ABSTRACT

A valve assembly comprises a valve carrier slidably received in a central bore of a valve body, a valve washer assembly mounted for movement with the carrier, the washer assembly including at least one spherically shaped contact surface for contacting an annular seat located between inlet and outlet ports of the valve.

2 Claims, 3 Drawing Figures

QUICK-ACTING VALVE ASSEMBLY

This is a continuation, of application Ser. No. 484,188 filed June 28, 1974 now abandoned.

CROSS REFERENCE TO RELATED APPLICATIONS

This application discloses a valve assembly particularly suited for use with the PNEUMATIC TO HYDRAULIC CONVERTOR WITH INTEGRAL DUMP VALVE covered by my co-pending application Ser. No. 417,707 filed Nov. 20, 1973 and now abandoned, and the Pneumatic to Hydraulic Convertor with Integral Dump Valve and Chamber covered by my co-pending application Ser. No. 501,939 filed Aug. 29, 1974, which are hereby incorporated by reference.

BACKGROUND OF THE INVENTION

This invention relates to the field of quick acting pneumatic or hydraulic valves. Such valves may be used for admitting fluid under pressure to a pneumatic or hydraulic component which operates on such fluid pressure in a first position of the valve; and for permitting the pressurized fluid to escape from the pneumatic or hydraulic component to effect a depressurization thereof when the valve is in a second position.

As discussed in my co-pending application Ser. No. 417,707, now abandoned, such valves find particular application in rail car braking systems wherein they are useful for depressurizing portions of the brake actuating system to prevent slipping or skidding of the rail car wheels during braking. In applications such as that disclosed in Ser. No. 417,707, now abandoned, a large number of such valves are used in a given train, each valve being individually actuated by a solenoid. In such slip prevention applications, each valve in the rail car is actuated using power from a local power supply such as a chargeable battery located in each car. In other applications, such as in the electrically operated brake system disclosed in my U.S. Pat. No. 3,545,816 the valves through-out the train may be actuated from a single power source. In such brake actuation applications, the electrical operating characteristics of the valve are critical, since very high power requirements for each solenoid operated valve would require the use of a large power source located in the forward car of the train and very heavy guage conductors running aft through the train, in order to insure that each solenoid operated valve from the front to the rear of the train receives adequate power for its actuation. Known types of solenoid valves suitable in some respects for this type of service are found to be unsatisfactory due to the excessive amounts of electrical power required for their operation and to the slowness of their response to a control signal.

It is an object of this invention to provide a solenoid actuated valve assembly which produces a maximum valve actuating force and, yet, requires a minimum operating power for adequate valve operation.

It is a further object of this invention to provide a valve assembly in which a minimum amount of actuating force is required to operate the valve and, yet, the valve will remain properly seated at all times.

It is a further object of this invention to provide a valve assembly in which the force required to actuate the valve may be easily adjusted.

Yet another object of this invention is to provide a solenoid actuated valve assembly in which the amount of valve opening provided by the solenoid may be easily adjusted, thereby simultaneously adjusting the power required to actuate the valve.

Still another object of this invention is to provide a valve assembly having a valve carrier slidably received in a central bore of a valve body, a valve washer assembly mounted for movement with the carrier and means associated with the valve washer assembly for insuring full contact between the valve washer assembly and a valve seat located within the central bore of the valve body, regardless of random motion or wobble of the valve carrier within the central bore.

DESCRIPTION OF THE PREFERRED EMBODIMENT

Figure 1:
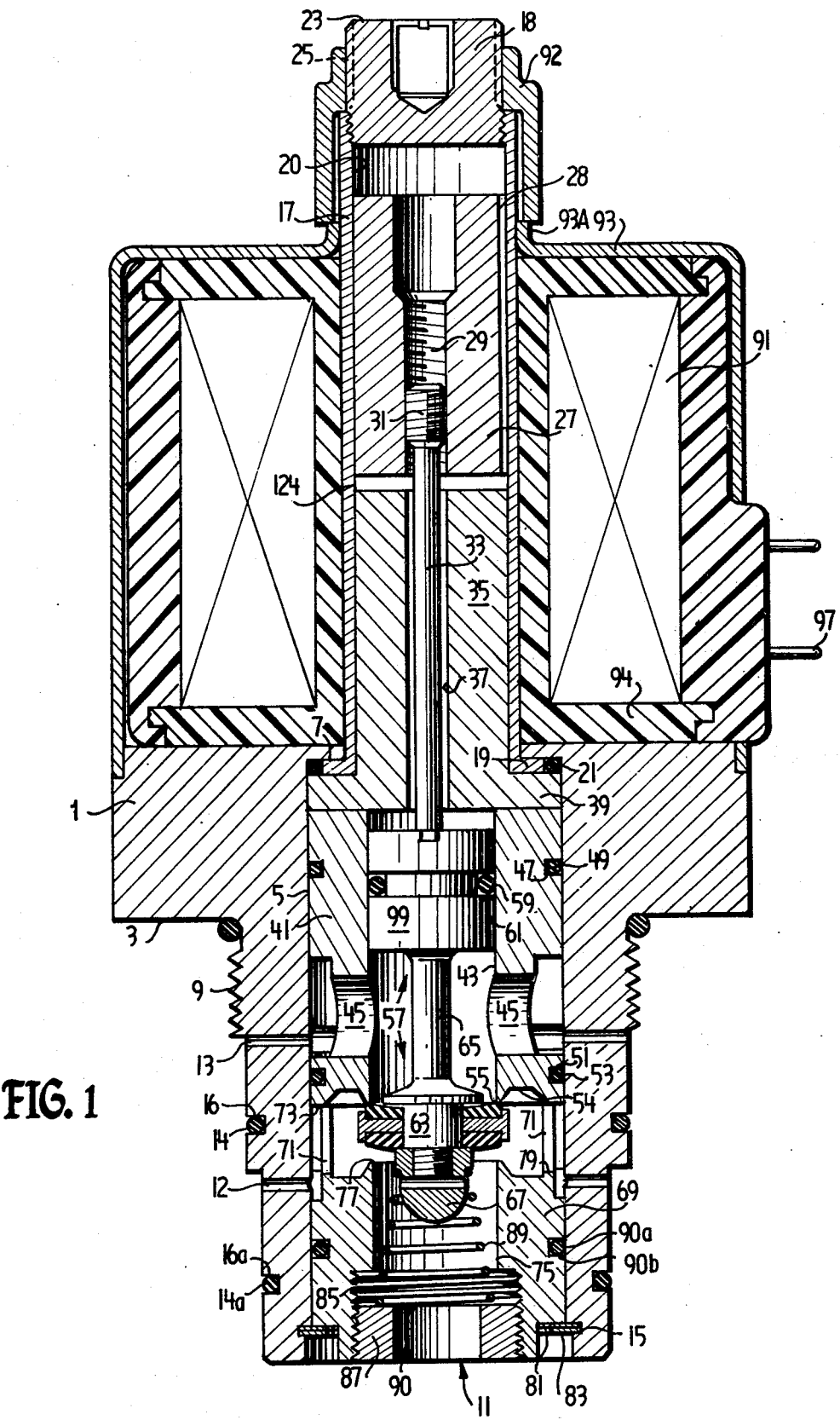
FIG. 1 shows an elevation view, primarily in section, of a valve assembly according to the invention.

There follows a detailed description of a preferred embodiment of the invention, reference being had to the drawings in which like reference numerals identify like elements of structure in each of the several Figures.

Referring to FIG. 1, the valve assembly of the invention includes a valve body or cartridge 1 of steel or similar magnetic material which includes at its upper end an outwardly extending coil support flange 3. A central bore 5 extends through valve body 1 at a constant radius with the exception of plunger guide and pole piece retaining flange 7 which extends radially into central bore 5 at the upper end thereof. Just below coil support flange 3 are located mounting threads 9 which are used to mount the valve body to adjacent structure (not shown) which may include pressurized fluid inlet and outlet conduits arranged in flow through relationship with high pressure fluid inlet 11, normal fluid outlet 12 and blow down outlet 13. Ser. No. 417,707 discloses such mounting structure. High pressure inlet 11 is located at the lower end of central bore 5; whereas, normal fluid outlet 12 and blow down outlet 13 extend radially through the vertical walls of valve body 1. A sealing device such as O-ring 14 may be located in groove 16 between outlets 12 and 13 to prevent leakage between the alternate outlet ports. Similarly, O-ring 14 A, located in groove 16 A, prevents leakage between inlet port 11 and normal outlet port 12. The lower end of central bore 5 is counterbored as indicated and includes a peripheral retainer groove 1B for the lower valve seat, as will be discussed.

A plunger guide cylinder 17 is inserted upwardly through bore 5 until its integral radial flange 19 abuts plunger guide and pole piece retainer flange 7 as shown. The upper end of plunger guide cylinder 17 is threaded as indicated to receive cap 18. Thus, the central bore 20 of plunger guide 17 is arranged co-axially and in fluid communication with central bore 5 of valve body 1. O-ring 21 provides a seal between radial flange 19 and central bore 5. The outer surface 23 of plunger guide cap 18 is threaded as indicated at 25 for purposes to be discussed subsequently. Both the plunger guide cylinder 17 and its cap 18 may be manufactured of aluminum or other suitable non-magnetic material.

Slidably received within bore 20 of plunger guide cylinder 17 is plunger 27 which is carefully sized at its outer diameter to provide a maximum clearance with plunger guide cylinder 17 of approximately 0.010 to 0.015 inches, for purposes to be discussed. Threaded bore 29 extends along the longitudinal axis of plunger 27 for receiving threaded end 31 of plunger rod 33. An axial groove 28 extends from the upper to the lower ends of plunger 27 at the periphery thereof, for purposes to be discussed. Plunger 27 may be manufactured of steel or similar magnetic material; whereas, plunger rod 33 is of aluminum or similar non-magnetic material. Pole piece 35 is snugly received within central bore 20 of plunger guide cylinder 17 and includes a central bore 37 which loosely surrounds plunger rod 33. An integral radial flange 39 extends from the lower end of pole piece 35 and abuts radial flange 19 of plunger guide cylinder 17 and sealingly engages O-ring 21 in the manner indicated.

A combination spool guide and upper valve seat 41 is located in central bore 5 of valve body 1 just below pole piece 35 and in abutting engagement with radial flange 39. Combination spool guide and valve seat 41 is of essentially cylindrical configuration and includes a central valve carrier bore 43 which is pierced by radial ports 45 to provide fluid communication with blow down outlet ports 13. Grooves 47 and 51, located near the upper and lower ends of element 41 receive O-rings 49 and 53. O-ring 49 minimizes leakage of pressurized fluid flowing through radial ports 45 to the area just below bore 37 in pole piece 35. O-ring 53 minimizes leakage between blow down outlet port 13 and normal outlet port 12 when the valve is in the position illustrated. The lower surface of combined spool guide and upper valve seat 41 includes an annular cut-away portion 54 which defines a downwardly facing annular valve seat 55 surrounding the central bore 43 of spool guide and valve seat 41. Spool guide and valve seat 41 may be of bronze or other non-magnetic material.

Slidably received in central bore 43 is valve spool or carrier 57 which is sealed in its motion relative to bore 43 by O-ring 59 located in groove 61 of piston 99 located at the upper portion of the valve carrier 57. Attached to the lower end of valve carrier 57 is dual valve assembly 63 which extends radially from axial shaft 65 of carrier 57 at a location below annular valve seat 55. Dual valve washer assembly 63 is retained on shaft 65 by acorn nut 67. The details of valve spool or carrier 57 will be considered further with regard to FIG. 2.

Lower valve seat 69 is slidably received in central bore 5 of valve body 1 and includes an upwardly extending rim 71 which abuts the lower surface 73 of upper valve seat 41, just outside annular cut-away portion 54. Upwardly extending rim 71 includes radial openings providing communication with normal fluid outlet ports 12. A central bore 75 extends through lower valve seat 69 and is surrounded at its upper end by upwardly extending annular valve seat 77. The lower end of lower valve seat 69 is retained by snap ring 83, located in retainer groove 15 of valve body 1. Central bore 75 of lower valve seat 69 includes a threaded counter bore 58 at the lower end thereof which receives spring adjustment nut 87. A helical spring 89 is retained between adjustment nut 87 and the outwardly extending flange of acorn nut 67 to bias the dual valve washer assembly 63 into its normal position in engagement with downwardly facing annular valve seat 55. Spring adjustment nut 87 includes a central bore 90 which defines high pressure inlet 11. O-ring 90a is retained in outer circumferential groove 90b of lower valve seat 69 to provide a seal between high pressure inlet 11 and normal outlet 12 when the dual valve washer assembly 63 is seated on upwardly extending annular valve seat 77 by the valve actuator. The lower valve seat 69 may be of steel or other suitable material.

A valve actuating coil assembly 91 is slidably received on the exterior of plunger guide cylinder 17 and retained there by retainer nut 92 which cooperates with thread 25 of plunger guide cap 18 and bears upon coil housing 93 to clamp the coil assembly between plunger guide cap 18 and coil support flange 3. Thus, coil assembly 91 may be easily removed when required without necessitating further disassembly of the valve. In a preferred embodiment, the coil assembly 91 comprises a spool 94 of nylon or paper laminate upon which are wound 7800 turns of 0.010 inch Formax or Form Var wire, the spool and wire being incased in epoxy resin, which provides a resistance to ground of 310 to 340 ohms at 68° F. A coil connector 97 completes the solenoid coil assembly. A solenoid assembled in this fashion will operate at a nominal 60 volts; however, it has been found that sufficient magnetic force is generated to actuate the valve assembly of the invention at operating voltages as low as approximately 8 volts applied to the coil. Thus, the operating voltage may be high to ensure quickest actuation in slip-prevention applications, yet due to low friction and small air gaps, voltage may be low to minimize power requirements in brake-actuation applications, without departing from the spirit of the invention.

Coil housing 93, of steel or other magnetic material, provides a flux return path for magnetic flux developed in coil 91. The flux travels in a toroidal path, from coil 91 through the upper portion of plunger guide 17, through plunger 27, across working air gap 124, through pole piece 35, through coil support flange 3 and up through coil housing 93. To provide an adequate flux path from housing 93, through the upper portion of plunger guide 17, coil housing 93 includes an axially extending lip 93A which is sized diametrically to fit closely to plunger 17 and axially to provide an increased area for flux transfer to plunger guide 27 through plunger guide 17. Thus, by also making plunger guide 17 as thin as practicable, magnetic losses across the non-magnetic plunger guide 17 are minimized, thereby improving the efficiency of the solenoid actuator.

Figure 2:
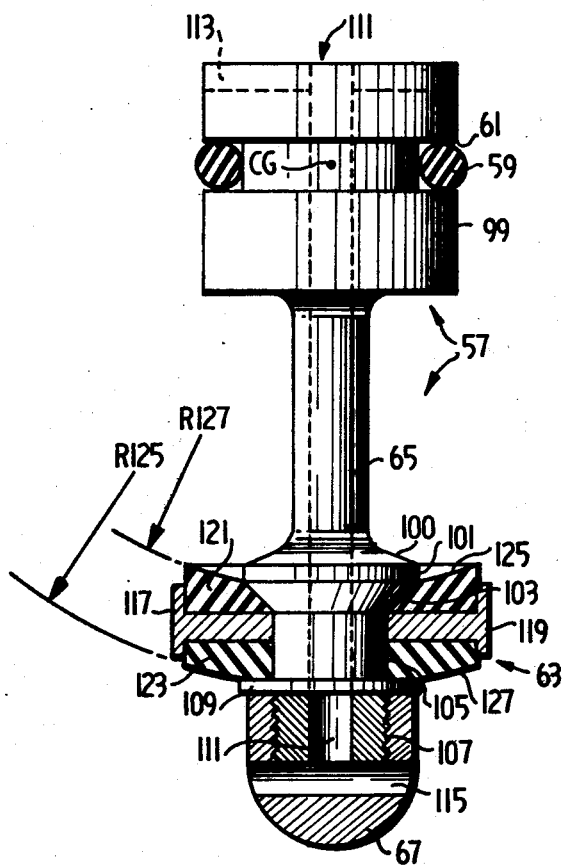
FIG. 2 shows an elevation view, partially in section, of a valve carrier and valve washer assembly according to the invention.

Turning now to FIG. 2, the details of valve spool or carrier 57 may be understood. Carrier 57 may be steel or other magnetic material. A piston 99 is integrally attached to the upper end of spool shaft 65, as indicated, the piston including a peripheral groove 61 housing an O-ring 59 for purposes previously discussed. Groove 61 is located at essentially the center of the vertical height of piston 99. As valve spool 57 moves in bore 43, it will tend to pivot or wobble essentially about the center CG of the O-ring. This wobbling or pivoting is due to the clearances required between piston 99 and central bore 43 to provide optimally low friction between these components during movement of valve spool 57, and is limited by the contact between the upper and lower corners of piston 99 with bore 43. At the lower end of spool shaft 65, the shaft slopes outwardly as indicated at 100 to define a vertical, essentially cylindrical surface 101 and then inwardly as indicated at 103 to retainer shank 105 which is threaded at its lower end 107. Acorn nut 67 is mounted on end 107 and compresses dual valve washer assembly 63 against tapered surface 103 via washer 109. A diametrical slot 113 is located in the top surface of piston 199, as indicated in phantom and communicates with a longitudinal bore 111 which passes through piston 99, spool shaft 65, retainer shank 105 and threaded portion 107. A diametrical bore 115 is located in acorn nut 67 in communication with central bore 111, to eliminate the dynamic pressure component of the pressure seen by central bore 111.

Figure 3:
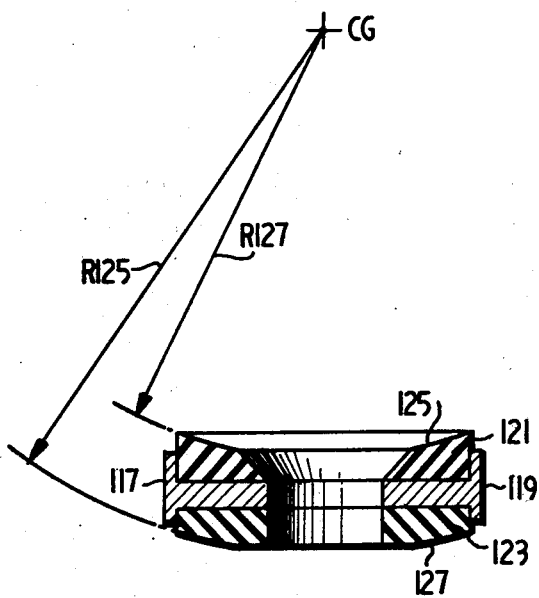
FIG. 3 shows sectional views of the unique valve washers of the invention.

Referring now to FIGS. 2 and 3, the details of dual valve washer assembly 63 may be understood. Assembly y63 comprises a valve retainer disk 117 which includes an integral peripheral retaining wall 119 extending above and below its surface, thereby providing recesses for receiving upper and lower valve washers 121 and 123. Due to the clearance required between piston 99 and central bore 43 of combined spool guide and upper valve seat 41, valve spool or carrier 57 tends to rock or wobble slightly about point CG located at approximately the center of piston 99. This causes the valve washers 121 and 123 to move relative to their respective annular seats 55 and 57. If valve washers 121 and 123 were to have flat upper and lower surfaces, such movement would cause the flat surfaces of the valve washers to be cocked relative to their annular seats, thus resulting in undesirable leakage. To insure proper seating of washer 121 against annular seat 55 under the action of helical spring 89 and to insure proper seating of washer 123 against annular seat 77 under the action of solenoid coil 91, the contact surfaces 125 and 127 of washers 121 and 123 are formed as segments of spheres having the radii R125 and R127 drawn from CG as shown. As shown, upper contact surface 125 is spherically concave; whereas lower contact surface is spherically convex, both surfaces having a common center of curvature at CG. Thus, valve carrier 57 may wobble due to the dynamic effects of pressurized fluid rushing through the valve but will nonetheless always seat properly against either of annular seats 55 and 57.

In operation, the valve assembly according to the invention is installed in a housing providing pressurized fluid communication with inlet port 11. Normal outlet port 12 could be connected to a device to be pressurized such as pneumatic to hydraulic convertor of the type used in some rail car brake systems. Blow down outlet ports 13 could be connected to an expansion volume or, via a choke, to atmosphere as taught by my co-pending application Ser. No. 417,707. Pressurized fluid flows through inlet port 11, up through central bore 75, over upwardly extending annular valve seat 77 and out through outlet ports 12 to the component to be pressurized. Helical spring 89 biases dual valve washer assembly 63 upwardly so that washer 121 is maintained in sealing contact with annular valve seat 55. In the event that it is desired to depressurize the component communicating with normal outlet ports 12, solenoid coil 91 is energized, thereby forcing steel plunger 27 downward as shown in FIG. 1 causing plunger rod 37 to engage the upper surface of valve carrier piston 99, thereby forcing dual valve washer assembly 63 to unseat from upper annular valve seat 55 and to reseat on lower annular valve seat 77. Pressurized fluid is thus free to flow back through ports 12, over the upper surface of valve washer 121 and out blow down exhaust port 13. In the meantime, the flow of pressurized fluid through inlet port 11 has been stopped by the seating of valve washer 123 against upwardly extending annular valve seat 77. Due to the small air gaps existing (a) between plunger guide cylinder 17 and plunger 27 and (b) between plunger 27 and pole piece 35, the magnetic force generated by solenoid coil 91 acutates the valve quickly to move dual washer assembly 63 between the two annular valve seats 55 and 57.

When the solenoid coil 91 is de-energized dual valve washer assembly 63 is forced upward by helical spring 89 toward seating contact with downwardly extending annular valve seat 55. During this portion of the operation cycle of the valve, the diametrical bore 115 in acorn nut 67 plays an important role. If the pressure of fluid entering through inlet port 11 were permitted to act directly upwardly through central bore 111 in valve carrier 57, the pressure existing in the volume above piston 99 would include the dynamic and static components of the pressure in the fluid entering inlet piston 11. Simultaneously, the rush of pressurized fluid between upwardly extending annular valve seat 77 and the lower surface of dual valve washer assembly 63, due to the venturi effect at that location, would tend to create below assembly 63 a zone of reduced pressure essentially equal to the static component of the pressure acting over piston 99. The combination of a relatively high pressure above piston 99 and a relatively low pressure below valve washer assembly 63 could cause the movement of valve carrier 57 to be rather slow or sluggish in the upward direction, in spite of the effect of helical spring 89. Diametrical bore 115 alleviates this problem by essentially eliminating the dynamic component of the pressure of the fluid in bore 111 so that the static pressure component alone is experienced above piston 99, which is essentially equal to the reduced pressure acting below dual valve washer assembly 63. This permits helical spring 89 to quickly re-establish sealing contact between washer 121 and annular seat 55.

The valve assembly according to my invention incorporates additional provisions for balancing pressure forces acting on opposing surfaces of its various translating elements. When the valve is in the position shown in FIG. 1, the reduced pressure caused by the venturi effect below dual valve washer assembly 63 acts upon the lower surface of assembly 63; whereas, an essentially equivalent pressure acts above piston 99 on approximately the same area, to create a pressure balance. The pressures acting above and below plunger 27 are equalized by axial groove 28, thereby eliminating any piston effects and reducing friction. When the valve moves to its alternate position in which inlet port 11 is closed and flow exists between ports 12 and 13, the static pressure acting on the bottom of dual valve washer assembly 63 is again balanced by the pressure above piston 99. Within bore 43 of upper valve seat 41, the flow of fluid between upper valve washer 121 and downwardly extending valve seat 55 creates a pressure force on the upper surface of dual valve washer assembly 63 which is balanced by an essentially equivalent force caused by the pressure acting on underside of piston 99 as the fluid exhausts through radial ports 45.

As can now be understood, the normal position of the valve assembly of this invention is that in which valve washer 121 is maintained in sealing contact with annular valve seat 55 by helical spring 89. Upon energization of solenoid coil 91, plunger 27 is caused to move downward, thereby forcing plunger rod 33 into contact with valve carrier 57 and moving valve washer 123 into sealing contact with annular valve seat 77. Plunger 27 is caused to move through the working air gap 124 of the solenoid actuator by the magnetic field generated by solenoid coil 91 which will force plunger 27 downward in order to collapse air gap 124, thereby shortening the overall magnetic path. Generally, the larger the working air gap between plunger 27 and pole piece 35, the greater will be the power required in solenoid coil 91 to move plunger 27 downward through said air gap. Thus, it is desirable to be able to adjust the maximum length of air gap 124 in order to minimize the power required to insure proper actuation of the valve. To this end, retainer nut 92 and plunger guide cap 18 may be removed from plunger cylinder 17 permitting access to threaded end 31 of plunger rod 33 which may be moved up or down within threaded bore 29 of plunger 27 as necessary to adjust the working air gap to the minimum required for proper operation of the valve. These same features permit the working air gap to be enlarged if necessary to account for wear at washer 123 or annular valve seat 77. As previously discussed, the compression of helical spring 89 may be adjusted via the spring tension adjusting nut 87 in order to vary the force with which washer 121 is seated against annular valve seat 55. The adjustment of nut 87 must be made in consideration of the amount of force which is to be applied by solenoid coil 91 to move valve carrier 57 downward against the counter acting force of spring 89. That is, the tension of spring 89 must be adjusted to insure adequate seating against annular valve seat 55 without requiring excessive force to be applied by solenoid coil 91.

Having described my invention with such specificity as to enable one skilled in the art to make and use it, I claim:

1. A valve comprising:
 a valve body having a first central bore, said bore having an axial opening for admitting fluid under pressure and first and second radial openings for exhausting fluid under pressure, spaced axially from said axial opening and from each other;
 a first annular valve seat located in said first central bore between said axial opening and said first radial opening;
 a second annular valve seat located in said first central bore between said first radial opening and said second radial opening;
 a valve carrier piston slidably received in said first central bore;
 a valve washer assembly mounted on one end of said carrier piston for selective seating on said first or said second annular valve seat;
 a second central bore extending axially through said valve carrier piston and valve washer assembly;
 an adjustment nut threaded within said first central bore below said first annular valve seat and a spring captured between said adjustment nut and said valve washer assembly for biasing said valve washer assembly into contact with said second annular valve seat;
 means cooperating with said valve carrier piston for moving said valve washer assembly out of contact with said second annular valve seat and into contact with said first annular valve seat; and
 means for essentially eliminating the dynamic component of the fluid pressure in said second central bore, whereby static pressure alone is experienced at the other end of said carrier piston.

2. A valve as defined in claim 1, wherein said second central bore is closed at its end adjacent said valve washer assembly and said means for eliminating the dynamic component comprises:
 a diametrical bore connecting said second, axially extending central bore to said first central bore, thereby equalizing pressure forced acting on the other end of said carrier piston and said valve washer assembly.

* * * * *